United States Patent [19]

Hale et al.

[11] 4,219,163
[45] Aug. 26, 1980

[54] CLOSING MECHANISM FOR A FINE MATERIAL PAN ON A MANURE SPREADER

[75] Inventors: John K. Hale, Waterloo, Belgium; William F. Ostergren, Terre Hill, Pa.

[73] Assignee: Sperry Corporation, New Holland, Pa.

[21] Appl. No.: 13,949

[22] Filed: Feb. 22, 1979

[51] Int. Cl.³ ............................................. A01C 15/16
[52] U.S. Cl. .................................. 239/662; 239/676; 239/679; 222/506
[58] Field of Search ............... 239/662, 676, 679, 680; 222/505, 506, 556

[56] References Cited

U.S. PATENT DOCUMENTS

| | | | |
|---|---|---|---|
| 3,123,363 | 3/1964 | Hedtke | 239/676 |
| 3,163,336 | 12/1964 | Henningsen | 222/505 |
| 3,298,695 | 1/1967 | Brackbill et al. | 239/662 |
| 3,603,486 | 9/1971 | Fickle et al. | 222/556 |

*Primary Examiner*—Robert W. Saifer
*Attorney, Agent, or Firm*—Larry W. Miller; Frank A. Seemar; Ralph D'Alessandro

[57] ABSTRACT

A device for automatically closing the fine material pan on a manure spreader is disclosed wherein, after being released to a clean-out position, the motion of the fluid endgate is utilized to return the fine material pan to its normal operating position. A lost motion linkage connects the fine material pan to the arm of the fluid endgate. A retraction of the fluid endgate to a transport position through manipulation of a tractor's hydraulic system effects a closing of the fine material pan without the operator having to dismount the tractor.

22 Claims, 6 Drawing Figures

CLOSING MECHANISM FOR A FINE MATERIAL PAN ON A MANURE SPREADER

BACKGROUND OF THE INVENTION

The present invention relates generally to manure spreaders and, more particularly, to an automatic closing device for the fine material pans commonly found on modern manure spreaders.

Due to increasing costs of labor and bedding material, the modern trend in livestock operations is to use less bedding material resulting in a manure having a higher moisture content and a less solidified consistency than previously standard pen-type manures. To aid in handling this more sloppy material, farmers have been requesting the inclusion of fine material pans on the standard box-type manure spreader. An example of a manure spreader fine material pan can be found in U.S. Pat. No. 3,298,695 granted to Brackbill et al. on Jan. 17, 1967.

Fluid endgates are also being included on the box-type spreaders to retain this soupy material within the spreader box during transport of the material to the site upon which the material is to be discharged. This fluid endgate operates as a false rear endwall for the spreader box. When the farmer wishes to discharge the material, the fluid endgate is rotated in most structures to a horizontal position above the spreader box where it does not interfere with the discharge of the material. Examples of fluid endgates can be found in U.S. Pat. No. 3,170,699 granted to C. A. Smith on Feb. 23, 1965, U.S. Pat. No. 3,632,050 granted to J. L. Lee on Jan. 4, 1972, and U.S. Pat. No. 4,072,272.

On presently operated spreaders, a fluid endgate and the fine material pan are separately mounted and operated. The fine material pan generally is hinged along its rearward side and secured against the spreader floor by a latching mechanism at its forward side. If, at the end of a run, the operator wishes to empty the fine pan of any material accumulated there, he merely releases the latch mechanism and the fine pan swings down about its hinged side.

Prior to the instant invention, to return the fine material pan to its operating position, secured against the spreader floor, the operator had to dismount the tractor and rotate the fine pan upward by hand. This process is both time consuming and objectionable to most operators.

SUMMARY OF THE INVENTION

It is an object of this invention to overcome the aforementioned disadvantages of the prior art by providing a novel device for automatically closing the fine material pan on a manure spreader.

It is another object of this invention to provide a less objectionable method for closing the fine material pan.

It is another object of this invention to provide a less time consuming way to close the fine material pan of a manure spreader.

It is still another object of this invention to provide a structure for closing the fine material pan which is operable hydraulically without the operator having to leave the tractor.

It is a further object of this invention to provide for a design which can be manufactured and utilized simply and inexpensively.

It is an advantage of this invention to provide for the capability of automatically closing the fine material pan while allowing the operator to continue to operate the manure spreader in the same manner as before.

It is a still further object of this invention to utilize the motion of the fluid endgate to close the fine material pan.

It is another advantage of this invention in providing the capability to release the fine material pan after the fluid endgate has been raised into an elevated position.

It is another feature of this invention to provide a structure for automatically closing the fine material pan with minimum effort from the operator.

It is a still further object of this invention to provide a device for automatically closing the fine material pan on a manure spreader which is durable of construction, inexpensive of manufacture, carefree of maintenance, facile in assemblage, and effective in use.

These and other objects, features and advantages are accomplished according to the instant invention by providing a device for automatically closing the fine material pan on a manure spreader wherein the motion of the fluid endgate is utilized to return the fine material pan to its normal operating position after being released to a clean-out position. A lost motion linkage connects the fine material pan to the arm of the fluid endgate. A retraction of the fluid endgate to a transport position through manipulation of the tractor's hydraulic system effects a closing of the fine material pan without the operator having to dismount the tractor.

BRIEF DESCRIPTION OF THE DRAWINGS

The advantages of this invention will become apparent upon consideration of the following detailed disclosure of the invention, especially when taken in conjunction with the accompanying drawings wherein.

DETAILED DESCRIPTION OF THE INVENTION

Figure 1:
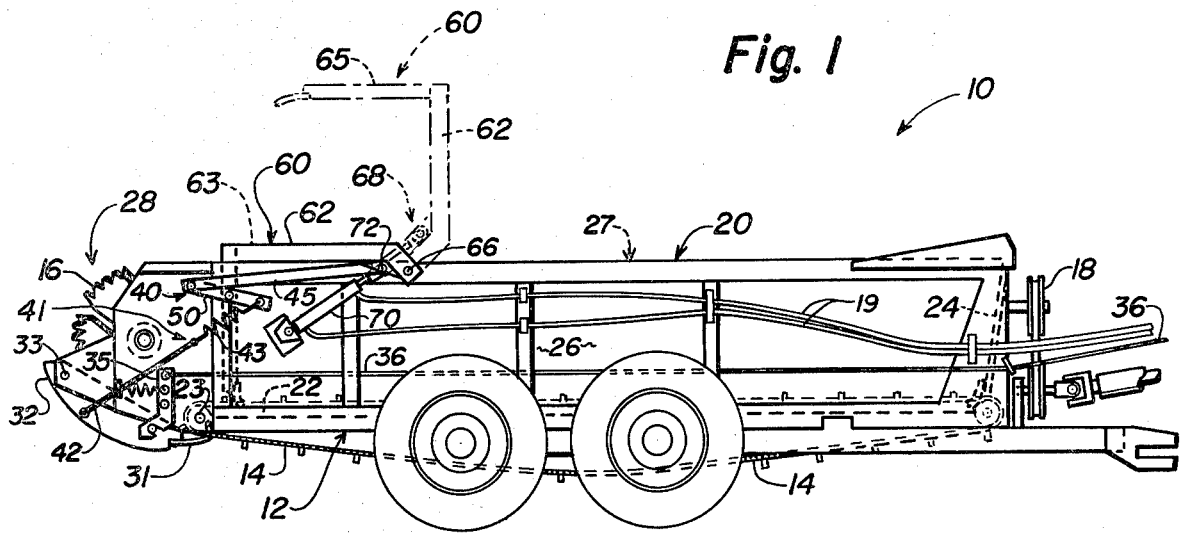
FIG. 1 is a side elevational view of a manure spreader incorporating the preferred embodiment of the instant invention showing all components in a closed transport position, the discharge position of the fluid endgate being shown in phantom.

Referring now to the drawings and particularly to FIG. 1, a side elevational view of a manure spreader can be seen. The manure spreader 10 is generally comprised of a mobile frame 12, a spreader box 20, a material conveying means 14, at least one beater assembly 16 and drive means 18, 19. When fine or semi-liquid material is to be distributed by the manure spreader 10, a fine material pan 30 and a fluid endgate 60 is usually included as optional attachments. Normally, drive means 18 is connected to the power take-off shaft of a tractor (not shown) for rotational power to the material conveying means 14 and the beater assembly 16. Drive means 19 is generally connected to the hydraulic system of a tractor (not shown) to provide a lifting power to the fluid endgate 60.

The spreader box 20 is usually of the open ended type and, as such, is composed of a floor 22, a front endwall 24, a right sidewall 26, a left sidewall 27 and an open rear discharge area 28. As seen in the drawings, since the left sidewall 27 is parallel to and laterally spaced from the right sidewall 26, the left sidewall 27 will be directly behind the right sidewall 26. One or more beater assemblies 16 are rotatably journalled between the sidewalls 26, 27. Some models are equipped with as many as three beater assemblies such as the manure spreaders shown in U.S. Pat. No. 4,026,476 issued to Ipnar el al. on May 31, 1977. As a matter of convenience, the drawings display a single beater assembly manure spreader. It will be readily realized by one skilled in the art that this invention is not limited by the number of beater assemblies disposed on the manure spreader.

Pertinent Structural Relationships

The fluid endgate 60 has a body portion 65 situated transversely between the sidewalls 26, 27. Each of two parallel arms 62, 63 project forwardly from the body portion 65 to connect with a hydraulic cylinder 70 comprising part of the drive means 19. Fluid endgate arm 63, being parallel to and laterally spaced from arm 62, will be directly behind arm 62 and not separately viewable in any of the side elevational views. Each parallel arm 62, 63 further extends to a pivot point 66 about which the fluid endgate 60 rotates upon actuation of the hydraulic cylinders 70.

Figure 2:
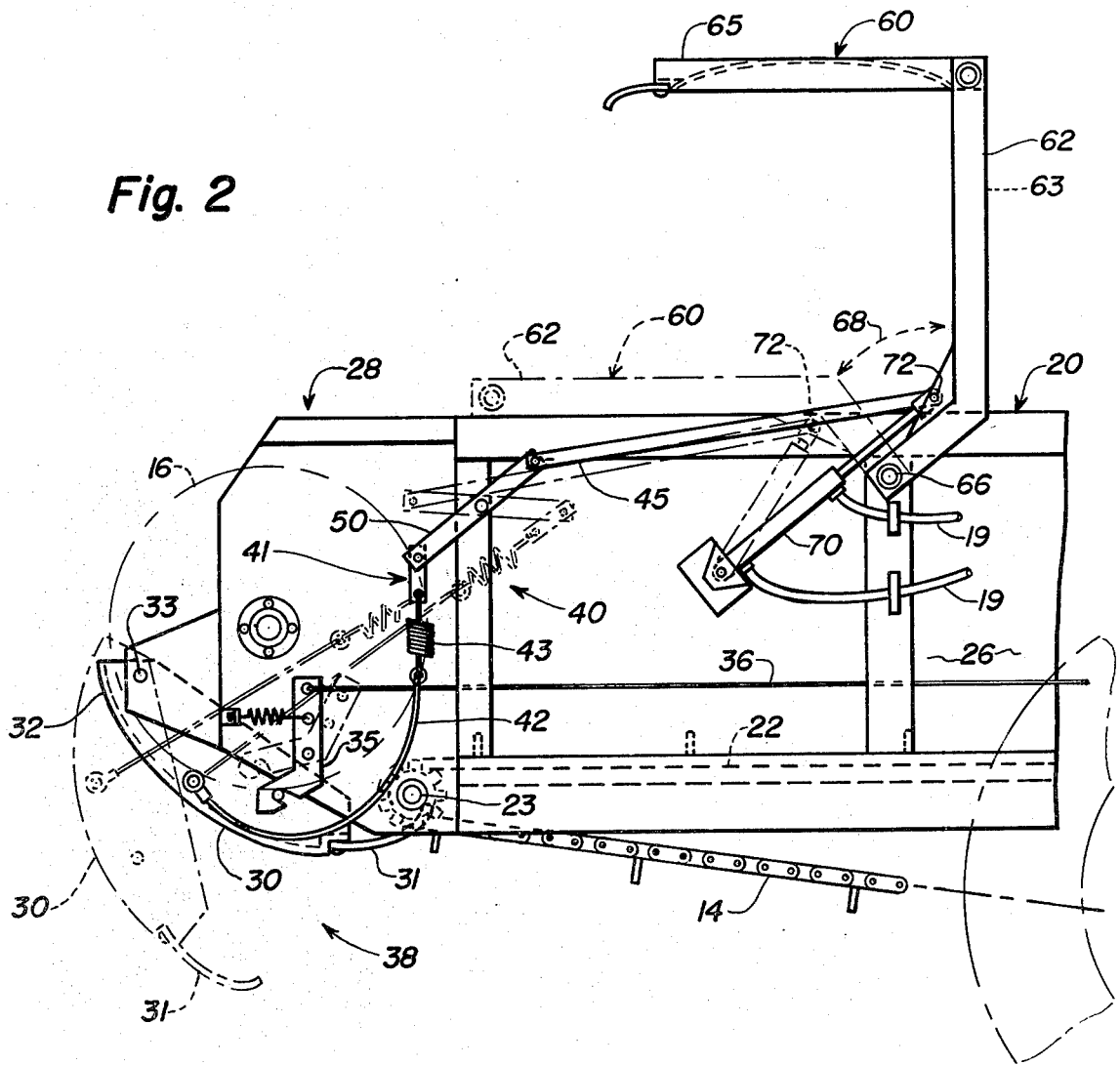
FIG. 2 is a partial side elevational view of a manure spreader incorporating the preferred embodiment of the instant invention on a larger scale than FIG. 1, showing a positional relationship of the components during discharge of a transported material, the fine material pan phantom lines showing the positional relationship during the clean-out phase after being released from the normally secured position, the transport position of the fluid endgate also being shown in phantom.

An extension of the hydraulic cylinders 70 produces a lifting force on the fluid endgate arms 62, 63 which rotates the body portions 65 to the substantially horizontal elevated position seen in FIG. 2. The function of the fluid endgate 60 in a transport position seen in FIG. 1. is to retain liquid and semi-liquid materials within the spreader box 20 while manure spreader 10 is transporting the enclosed material from the loading site to the discharge site. A raising of the fluid endgate 60 to the position seen in FIG. 2, allows the material conveying means 14 to convey the material rearwardly for engagement with the beater assembly 16.

The fine material pan 30 generally has a unitary semi-circular construction. The fine material pan 30 is normally positioned within the rear discharge area 28 transversely between the sidewalls 26, 27 tangential to the axis of rotation of the beater assembly 16. The fine material pan 30 is secured by a latch mechanism 35 such that the rubber seal 31 is positioned against the apron shaft 23 adjacent floor 22 so that material will not escape without engagement with the beater assembly 16. The rearward portion 32 of the fine material pan 30 is hingedly secured about a pivotal axis 33.

When substantially all of the material has been discharged from the spreader box 20 and the operator wishes to clean out the spreader box 20, the latch mechanism 35 can be activated by an external linkage 36 releasing the fine material pan 30 for downward rotation about the pivotal axis 33 as shown by phantom lines in FIG. 2. The resulting gap 38 between the fine material pan 30 and the apron shaft 23 enables the material conveying means 14 to better clean the floor 22 of excess material which does not engage the beater assembly 16.

The automatic closing device 40 incorporating the teachings of the present invention is shown attached to the fluid endgate 60 and the fine material pan 30 exterior of the sidewall 26. The preferred embodiment is composed of a bell crank 50 rotatably journalled on the sidewall 26, a rigid upper link 45 interconnecting the bell crank 50 and the arm 62 of the fluid endgate 60 and a flexible lower link 41 consisting of a cable 42 and a spring 43. The cable 42 is shown to be connected to the bell crank 50 and the spring 43 which extends to connect with the fine material pan 30.

The upper link 45 can be attached anywhere along the fluid endgate arm 62 except at the pivot point 66. As part of the teachings of this invention, it is necessary for the upper link 45 to undergo some physical displacement 68. A connection of the upper link 45 to the arm 62 at the pivot point 66 would not effect any positional displacement 68. As shown in FIGS. 1 and 2, the arbitrary point chosen for connecting the upper link 45 to the arm 62 is at the pin 72 connecting the hydraulic cylinder 70 to the fluid endgate arm 62.

The lower link 41 is connected to the fine material pan 30 at any point other than in line with the pivotal axis 33. It is necessary to develop a moment about the pivotal axis 33 to effect a closing of the fine material pan 30. A connection of the lower link 41 to the pivotal axis 33 would not develop the necessary moment. The spring 43 in the lower link 41 is not essential for the operation of the closing device 40. However, the spring 43 does allow for a more effective closing of the fine material pan 30 under conditions where the fine material pan 30 cannot completely return to the closed position adjacent the floor 22. Examples of such conditions would be when the material conveying means 14 is stopped between the fine material pan 30 and the floor 22 and when material becomes frozen at the end of the floor 22. Also, the spring 43 serves to impart stored energy to the fine material pan 30 to effect a more positive closing action.

Operation

During transport to the discharge site as best seen in FIG. 1, the fluid endgate 60 is in a transport position with the body portion 65 in a substantially vertical plane with the hydraulic cylinder 70 fully retracted. The fine material pan 30 is secured by the latch mechanism 35 in a closed position thereby preventing the fine material pan 30 from rotating about the pivotal axis 33. The rigid upper link 45 is at the extreme rearward end of any possible movement thereby. The bell crank 50 is forced into a "wrapped" position by the upper link. The lower link 41 is in a substantially taut state between the wrapped bell crank 50 and the fine material pan 30.

Prior to initiating the discharging of the material from the spreader box 20, the fluid endgate 60 is positioned in the discharge position wherein the body portion 65 is in a substantially horizontal plane elevated above the spreader box 20 by an extension of the hydraulic cylinder 70. The motion of the fluid endgate 60 causes the upper link 45 to move forwardly thereby "unwrapping" a bell crank 50. As seen in FIG. 2, the unwrapped bell crank 50 takes the tension off of the lower link 41 allowing it to fall slack. The fine material pan 30 remains in the closed position during the discharge phase to aid in the discharge of pen-type or semi-liquid material by the beater assembly 16.

After discharging all the material possible from the spreader box 20, the fine material pan 30 can be released by activating the latch mechanism 35 through manipulation of the external linkage 36. The released fine material pan then rotates downwardly about the pivotal axis 33 pulling the lower link 41 taut again.

To return all components to the original transport position, the hydraulic cylinder 70 is retracted causing the fluid endgate 60 to return to the transport position with the body portion 65 substantially vertical. This motion by the fluid endgate 60 forces the upper link 45 rearwardly thereby rewrapping the bell crank 50. The bell crank 50 in rewrapping pulls the taut lower link 41 which in turn pivots the fine material pan 30 upwardly toward the closed position. A re-engagement of the fine material pan 30 with the latch mechanism 35 secures the fine material pan 30 in the closed position after which the entire cycle may be repeated.

One particular advantage to the instant invention is that if, at the end of the discharge phase, the operator does not wish to release the fine material pan 30 to effect a clean-out, the fluid endgate 60 can be returned to the transport position, thereby rewrapping the bell crank 50 and retensioning the lower link 41 without releasing the fine material pan 30 from its closed position.

Alternative Embodiments

Figure 3:
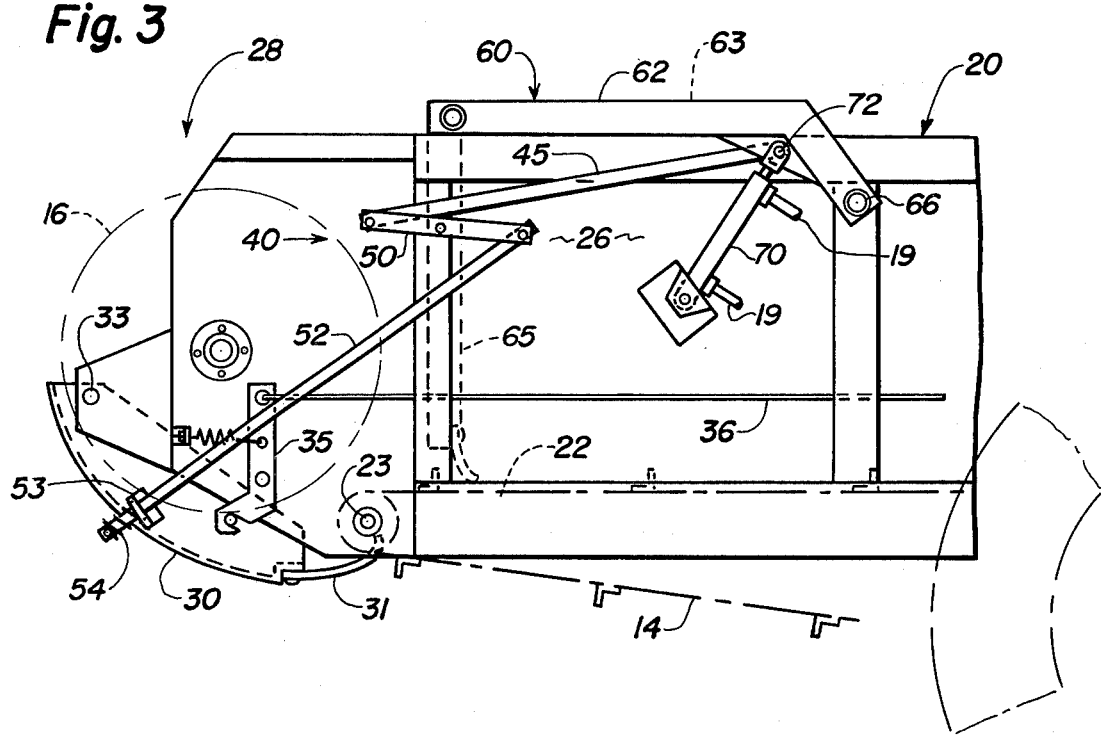
FIG. 3 is a partial side elevational view of a manure spreader incorporating a second embodiment of the instant invention showing all components in a closed transport position.
Figure 4:
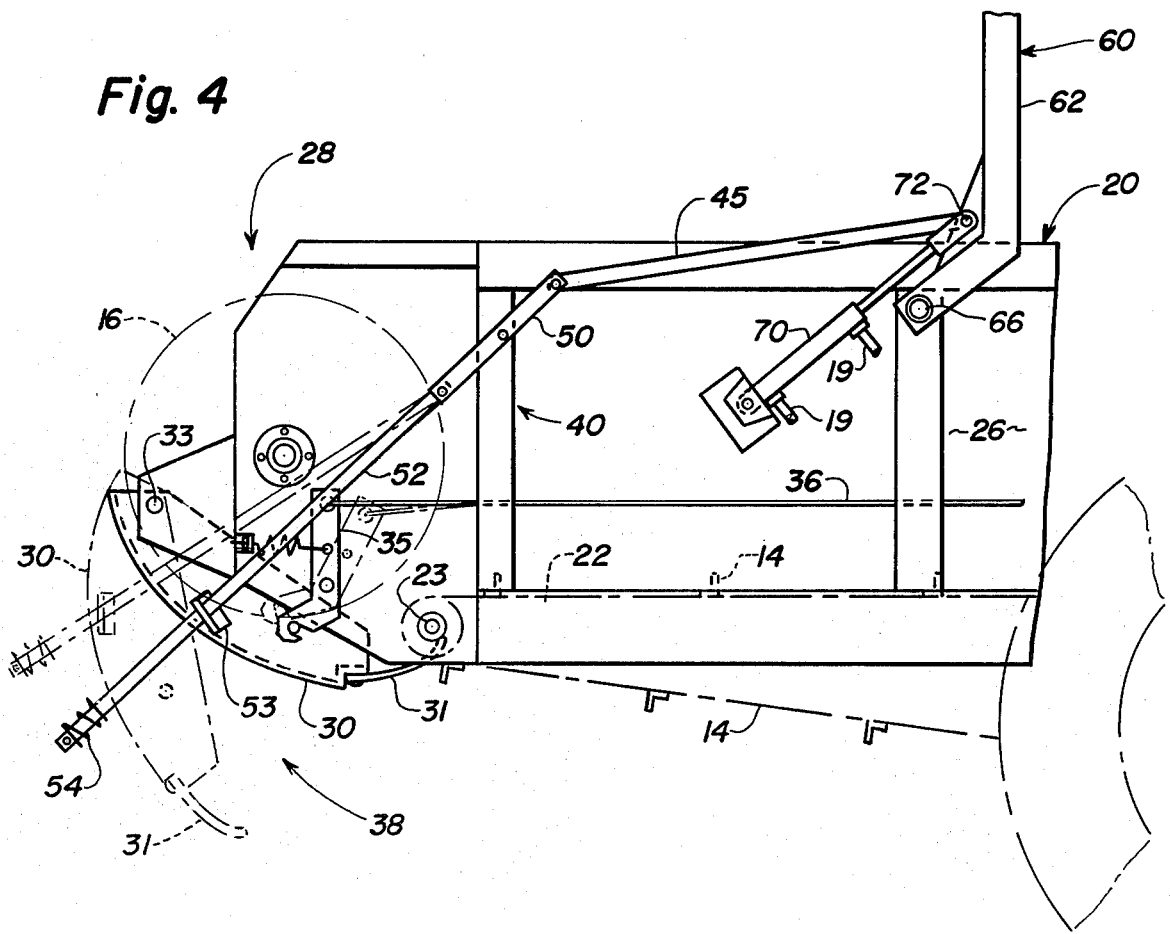
FIG. 4 is a partial side elevational view of a manure spreader incorporating the embodiment of FIG. 3 showing the positional relationship of the components during discharge of the transported material, the phantom lines showing the positional relationship of the components during the clean-out phase after the fine material pan has been released from the normally secured position.

FIGS. 3 and 4 reveal a second embodiment of the instant invention. The flexible lower link 41 in FIGS. 1 and 2 is replaced by a rigid lower link 52. The rigid lower link 52 is pivotally connected to the bell crank 50 and fitted through a slotted bracket 53 attached to the fine material pan 30. The rigid lower link 52 is free to slide through the slotted bracket 53 to compensate for the lost motion of the fine material pan before it is released to pivot downward about the pivotal axis 33. A spring 54 is incorporated into the rigid lower link 52 to compensate for varying conditions between the fine material pan 30 and the apron shaft 23 and to assure a more positive closing action in the same manner as the spring 43 in FIGS. 1 and 2.

The operation is essentially the same as with the preferred embodiment. The unwrapping bell crank pushes the rigid lower link 52 rearwardly, the rigid lower link 52 sliding through the slotted bracket 53 to compensate for the lost motion of the unreleased fine material pan 30. The release of the fine material pan 30 recovers the lost motion stored by the slotted bracket 53 after which a rewrapping of the bell crank 50 by the motion of the fluid endgate 60 will return the fine material pan 30 to the closed position.

Figure 5:
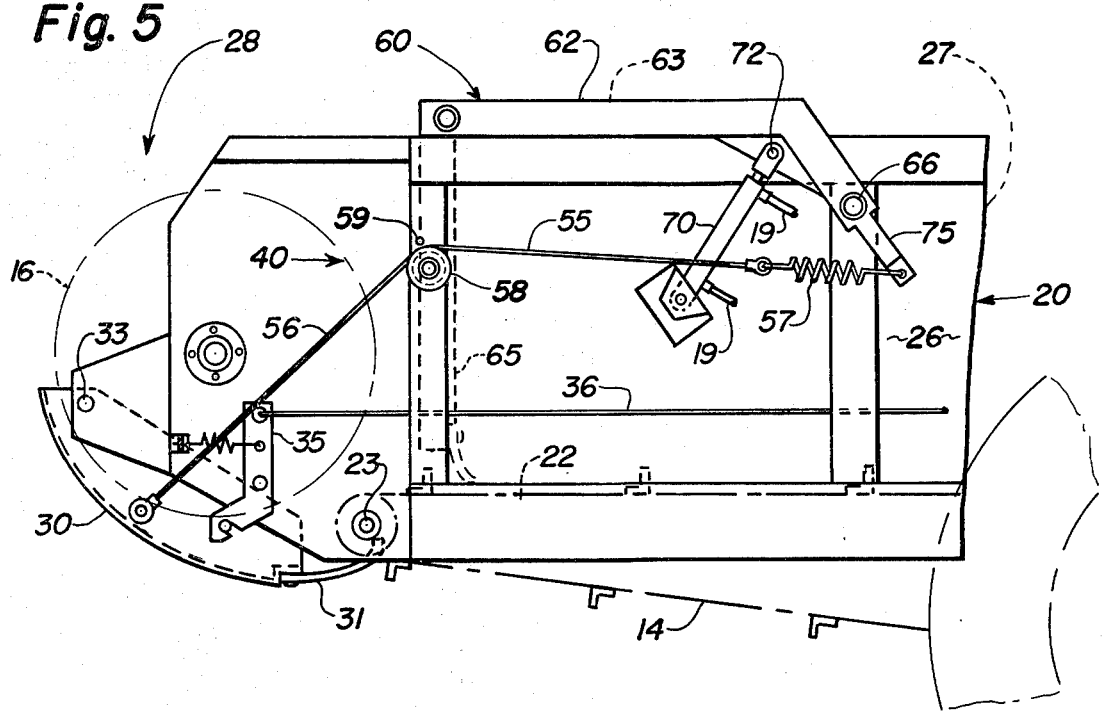
FIG. 5 is a partial side elevational view of a manure spreader incorporating a third embodiment of the instant invention showing all components in a closed transport position.
Figure 6:
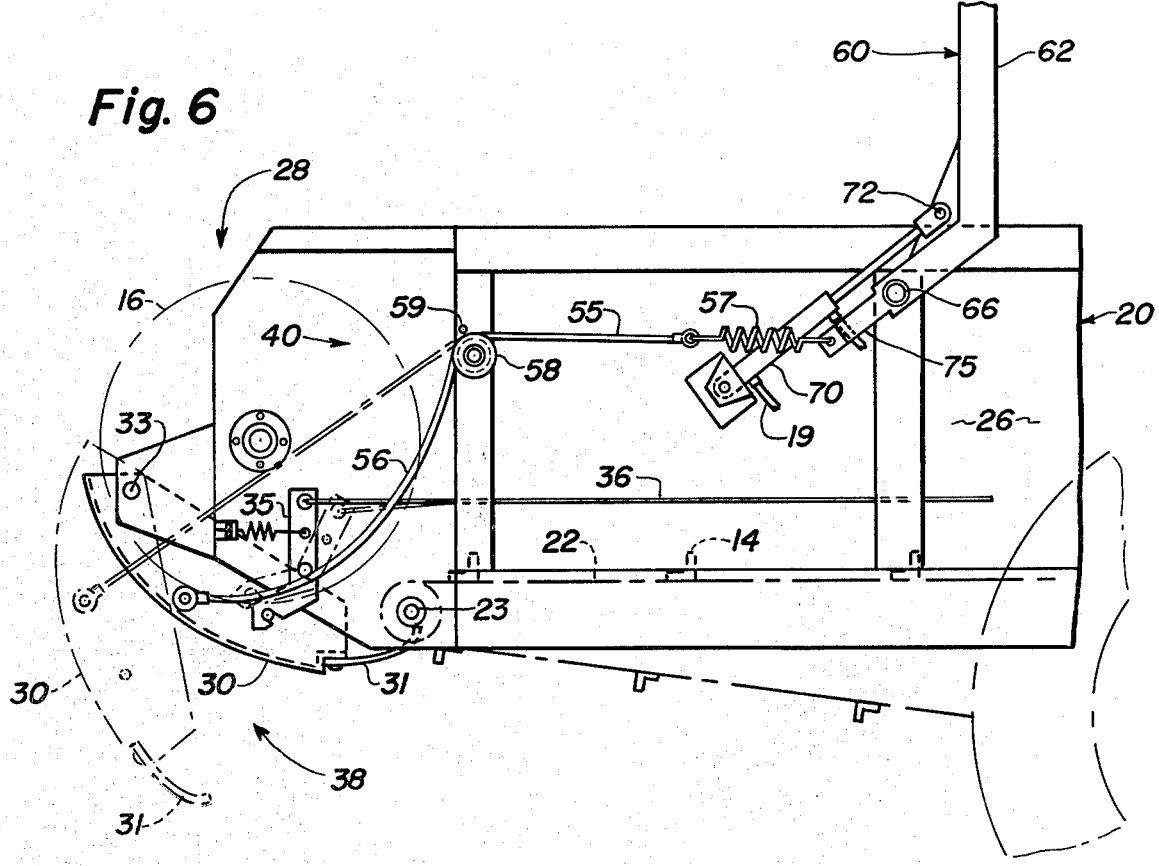
FIG. 6 is a partial side elevational view of a manure spreader incorporating the embodiment of FIG. 5 showing the positional relationship of a component during discharge of the transported material, the phantom lines showing the positional relationship of the components during the clean-out phase after the fine material pan has been released from the normally secured position.

FIGS. 5 and 6 reveal a third embodiment of the instant invention. A closing device is composed of a single flexible link 55 interconnecting the fine material pan 30 and the fluid endgate 60. A guide 58 is fixedly attached to the sidewall 26 to maintain a substantially linear relationship between the lower portion 56 of the flexible link 55 and the fine material pan 30 to facilitate the closing action. A pin 59 is affixed to the sidewall 26 above guide 58 to keep the flexible link 55 in place upon the guide 58 under slack conditions as seen in FIG. 6. A spring 57 is included for the same reasons as in the preferred embodiment. A support arm 75 is attached to the fluid endgate arm 62 such that when the fluid endgate 60 is in the transport position, the support arm 75 is angled forwardly.

In operation of the third embodiment, the particular arrangement of the support arm 75 allows the single flexible link 55 to go slack when the fluid endgate 60 is raised into the discharge position with a body portion 65 in a substantially horizontal plane elevated above the spreader box 20. A release of the fine material pan 30, allowing it to swing downwardly about the pivotal axis 33 pulls the flexible link 55 taut, after which the lowering of the fluid endgate 60 will return the fine material pan 30 to the closed position.

A combination of the preferred embodiment and the second embodiment will lead to a variation wherein the lower link is composed of a spring and a shorter rigid member. One skilled in the art will readily realize upon a reading of this disclosure that many such variations are possible and that the present invention is not limited to only the embodiments and variations specifically revealed herein.

It will be understood that various changes in the details, materials, steps and arrangements of parts which have been described and illustrated in order to explain the nature of the invention will occur to and may be made by those skilled in the art upon a reading of the disclosure within the principles and scope of the invention.

Having thus described the invention, what is claimed is:

1. In a manure spreader having a mobile frame adapted for movement across a field; an open ended spreader box mounted on said frame, said spreader box having a floor, a front endwall, two laterally spaced sidewalls and an open rear discharge area; a material conveying means for transporting material rearwardly within said spreader box towards said rear discharge area; a widespread material discharge means mounted on said frame adjacent said rear discharge area for the widespread discharge and distribution of material from said spreader box; a fine material pan extending transversely between said sidewalls adjacent said floor within said rear discharge area, said fine material pan having an elongate pivot end transverse between said sidewalls and a remote substantially parallel latch end, said fine material pan having a pivotal axis hingedly securing said fine material pan upon said frame along said pivot end, said fine material pan further having a latch means at said latch end for releasably securing said fine material pan to said spreader box; a fluid endgate extending transversely between said sidewalls above said floor for retaining semi-liquid material within said spreader box, said fluid endgate having a body portion and first and second arms, each said arm having a pivot means for pivotally securing said fluid endgate upon said frame, said fluid endgate being selectively movable from a closed position to an open position, wherein said body portion is elevated above said spreader box; and drive means connected to said widespread material discharge means said material conveying means and said fluid endgate for providing movement thereof, the improvement including a closing device for said fine material pan comprising:

at least one elongate member interconnecting said fine material pan and said fluid endgate, said at least one elongate member having a first end and a remote second end, said first end being affixed to said fine material pan at a point other than along said pivotal axis, whereby a moment about said pivotal axis can be created, said second end being attached to said fluid endgate such that upon movement between said closed position and said open position, the distance between said first end and said second end varies; and a takeup means for compensating for the differences in length required of said at least one elongate member when said fluid endgate moves between said closed position and said open position.

2. The manure spreader of claim 1 wherein said at least one elongate member is a flexible cable, said takeup means including a spring attached to said cable between said fine material pan and said fluid endgate.

3. The manure spreader of claim 1 wherein said closing device includes a first elongate member and a second elongate member, said takeup means includes a bell crank rotatably mounted on said frame, said first elongate member interconnects said fine material pan and said bell crank, said second elongate member interconnects said bell crank and said fluid endgate, said bell crank being disposed such that the rotation thereof compensates for said distance variation, said second elongate member being rigid and pivotally connected to said bell crank and said fluid endgate.

4. The manure spreader of claim 3 wherein said first elongate member is rigid and pivotally connected to said bell crank, said fine material pan further having a bracket affixed thereto adjacent said latch means, said bracket having a slot shaped hole therein, said slot shaped hole being aligned to cooperate with said first elongate member, said first elongate member being slidingly positioned within said slot shaped hole, said first elongate member further includes a spring adjacent said bracket to interact therewith.

5. The manure spreader of claim 3 wherein said first elongate member is a flexible member.

6. The manure spreader of claim 5 wherein said first elongate member includes a spring.

7. The manure spreader of claim 6 wherein said flexible member is a cable.

8. The manure spreader of claim 7 wherein said bell crank includes an elongate member having a length, said bell crank elongate member being pivotally connected upon said frame along said length.

9. The manure spreader of claim 8 wherein said drive means includes a hydraulic means connected to said fluid endgate for providing a lifting force thereto.

10. A manure spreader comprising:
a mobile frame adapted for movement across a field;
a spreader box mounted on said frame, said spreader box having a floor, a front end wall, a left sidewall, a right sidewall laterally spaced from said left sidewall, and a rear discharge area;
a material conveying means for transporting material rearwardly within said spreader box towards said rear discharge area;
a widespread material discharge means mounted on said frame adajcent said rear discharge area for the widespread discharge and distribution of material generally rearwardly from said spreader box;
a fine material pan extending transversely between said left sidewall and said right sidewall adjacent said floor within said rear discharge area, said fine material pan having an elongated pivot end being a pivotal axis between said right sidewall and said left sidewall rotatably securing said fine material pan, said fine material pan further having a remote latch end substantially parallel to said pivot end and a latch mechanism, said fine material pan being hingedly secured about said pivotal axis and releasably secured at said latch end by said latch mechanism;
a fluid endgate extending transversely between said sidewalls forward of said beater assembly above said floor for retaining semi-liquid material within said spreader box, said fluid endgate having a body portion, a first arm, a second arm laterally spaced from said first arm, and a pivot means for pivotally connecting each said arm on said frame, said fluid endgate being selectively movable from a transport position to a discharge position wherein said body portion is elevated above said spreader box;
a closing device interconnecting said fine material pan and said fluid endgate for cooperation therebetween to automatically close said fine material pan upon the return of said fluid endgate from said discharge position to said transport position, said closing device having at least one elongate member with a first end and a remote second end, said first end being affixed to said fine material pan at a point other than along said pivotal axis, whereby moment about said pivotal axis can be created, said second end being attached to said fluid endgate at a point other than at said pivot means, whereby a positional displacement of said second end occurs relative to said first end, said closing device further having a takeup means for compensating for said differences in length required of said at least one elongate member from when said fluid endgate is in said transport position to when said fluid endgate is in said discharge position; and
drive means connected to said widespread material discharge means, said material conveying means and said fluid endgate for providing movement thereto.

11. The manure spreader of claim 10 wherein said at least one elongate member is a flexible cable, said takeup means including a spring attached to said cable between said fine material pan and said fluid endgate.

12. The manure spreader of claim 10 wherein said closing device includes a first elongate member and a second elongate member, said takeup means includes a bell crank rotatably mounted on said frame, said first elongate member interconnecting said fine material pan and said bell crank, said second elongate member interconnecting said bell crank and said fluid endgate, said bell crank being disposed such that rotation thereof compensates for said positional displacement, said second elongate member being rigid and pivotally connected to said bell crank and said fluid endgate.

13. The manure spreader of claim 12 wherein said first elongate member is rigid and pivotally connected to said bell crank, said fine material pan further having a bracket affixed thereto adjacent said latch means, said bracket having a slot shaped hole therein, said slot shaped hole being aligned to cooperate with said first elongated member, said first elongated member being slidingly positioned within said slot shaped hole, said first elongated member further including a spring adjacent said bracket to interact therewith.

14. The manure spreader of claim 12 wherein said first elongate member is a flexible member.

15. The manure spreader of claim 14 wherein said first elongate member includes a spring.

16. The manure spreader of claim 15 wherein said flexible member is a cable.

17. The manure spreader of claim 16 wherein said bell crank includes an elongate member having a length, said elongate member being rotatably connected to said spreader box along said length.

18. In a manure spreader having a mobile frame adapted for movement across a field; an open ended spreader box mounted on said frame, said spreader box having a floor, a front endwall, two laterally spaced sidewalls and an open rear discharge area; a material conveying means for transporting material rearwardly within said spreader box towards said rear discharge area; a widespread material discharge means rotatably journalled between said sidewalls, said widespread material discharge means being mounted on said frame adjacent said rear discharge area for the widespread discharge and distribution of material from said spreader box; a fine material pan extending transversely between said sidewalls adjacent said floor within said rear discharge area, said fine material pan having an elongate pivot end transverse between said sidewalls and a remote, substantially parallel latch end, said fine material pan having a pivotal axis hingedly securing said fine material pan upon said frame along said pivot end, said fine material pan further having a latch means at said latch end for releasably securing said fine material pan to said spreader box; a fluid endgate extending transversely between said sidewalls above said floor for retaining semi-liquid material within said spreader box, said fluid endgate having a body portion and first and second arms, each said arm having a pivot means for pivotally securing said fluid endgate upon said frame, said fluid endgate being selectively movable from a closed position to an open position, wherein said body portion is elevated above said spreader box; and drive means connected to said widespread material discharge means, said material conveying means and said fluid endgate for providing movement thereof, the improvement including a closing device for said fine material pan comprising:

a bell crank rotatably affixed on said frame;

a first elongate member having a first end and a remote second end, said first end being affixed to said fine material pan at a point other than along said pivotal axis, whereby a moment about said pivotal axis can be created, said second end being attached to said bell crank; and a rigid second elongate member having a first end and a remote second end, said first end of said second elongate member being pivotally affixed to said bell crank, said second end of said second elongate member being pivotally attached to said fluid endgate at a point other than at said pivot means, whereby positional displacement of said second end of said second elongate member occurs relative to said first end of said first elongate member, said bell crank being disposed such that a movement of said fluid endgate from said open position to said closed position causes said bell crank to rotate and compensate for said positional displacement.

19. The manure spreader of claim 18 wherein said first elongate member is rigid and pivotally connected to said bell crank, said fine material pan further having a bracket affixed thereto adjacent said latch means, said bracket having a slot shaped hole therein, said slot shaped hole being aligned to cooperate with said first elongated member, said first elongated member being slidingly positioned within said slot shaped hole, said first elongated member further including a spring adjacent said bracket to interact therewith.

20. The manure spreader of claim 18 wherein said first elongate member is a flexible member.

21. The manure spreader of claim 20 wherein said first elongate member includes a spring.

22. The manure spreader of claim 21 wherein said flexible member is a cable.

* * * * *